United States Patent
Gregg et al.

(10) Patent No.: US 7,958,314 B2
(45) Date of Patent: *Jun. 7, 2011

(54) TARGET COMPUTER PROCESSOR UNIT (CPU) DETERMINATION DURING CACHE INJECTION USING INPUT/OUTPUT I/O) HUB/CHIPSET RESOURCES

(75) Inventors: Thomas A. Gregg, Highland, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 759 days.

This patent is subject to a terminal disclaimer.

(21) Appl. No.: 11/958,435

(22) Filed: Dec. 18, 2007

(65) Prior Publication Data

US 2009/0157979 A1  Jun. 18, 2009

(51) Int. Cl.
  *G06F 12/00* (2006.01)
(52) U.S. Cl. .......... 711/137; 711/E12.057; 711/E12.033
(58) Field of Classification Search .................. 711/137, 711/E12.057, E12.033
See application file for complete search history.

(56) References Cited

U.S. PATENT DOCUMENTS

| | | | |
|---|---|---|---|
| 5,072,369 A | 12/1991 | Theus et al. | |
| 5,119,485 A | 6/1992 | Ledbetter, Jr. et al. | |
| 5,228,135 A | 7/1993 | Ikumi | |
| 5,408,629 A | 4/1995 | Tsuchiya et al. | |
| 5,893,921 A | 4/1999 | Bucher et al. | |
| 5,987,571 A | 11/1999 | Shibata et al. | |
| 6,134,633 A | 10/2000 | Jacobs | |
| 6,173,371 B1 | 1/2001 | Arimilli et al. | |
| 6,546,471 B1 | 4/2003 | Tarui et al. | |
| 6,658,538 B2 | 12/2003 | Arimilli et al. | |
| 6,711,651 B1* | 3/2004 | Moreno et al. | 711/141 |
| 6,963,953 B2 | 11/2005 | Nakajima | |
| 2005/0246500 A1* | 11/2005 | Iyer et al. | 711/137 |
| 2007/0156968 A1* | 7/2007 | Madukkarumukumana et al. | 711/138 |
| 2008/0065832 A1* | 3/2008 | Srivastava et al. | 711/130 |
| 2008/0104325 A1* | 5/2008 | Narad et al. | 711/122 |
| 2008/0127131 A1* | 5/2008 | Gao et al. | 717/140 |
| 2008/0229009 A1* | 9/2008 | Gaither et al. | 711/113 |

OTHER PUBLICATIONS

León et al., "Reducing the Impact of the Memory Wall for I/O Using Cache Injection," IEEE, Aug. 2007, pp. 143-149.*
Huggahalli et al., "Direct Cache Access for High Bandwidth Network I/O," IEEE, 2005, pp. 1-10.*

(Continued)

*Primary Examiner* — Shane M Thomas
(74) *Attorney, Agent, or Firm* — Cantor Colburn LLP; Steven Chiu (57) ABSTRACT

A method, system, and computer program product for target computer processor unit (CPU) determination during cache injection using I/O hub/chipset resources are provided. The method includes creating a cache injection indirection table on the input/output (I/O) hub or chipset. The cache injection indirection table includes fields for address or address range, CPU identifier, and cache type. In response to receiving an input/output (I/O) transaction, the hub/chipset reads the address in an address field of the I/O transaction, looks up the address in the cache injection indirection table, and injects the address and data of the I/O transaction to a target cache associated with a CPU as identified in the CPU identifier field when, in response to the look up, the address is present in the address field of the cache injection indirection table.

17 Claims, 7 Drawing Sheets

OTHER PUBLICATIONS

Milenkovic et al., "Cache Injection on Bus Based Multiprocessors," IEEE, 1998, pp. 1-6.*
U.S. Appl. No. 11/958,418, filed Dec. 18, 2007.
U.S. Appl. No. 11/958,424, filed Dec. 18, 2007.
U.S. Appl. No. 11/958,431, filed Dec. 18, 2007.
U.S. Appl. No. 11/958,440, filed Dec. 18, 2007.
U.S. Appl. No. 11/958,445, filed Dec. 18, 2007.

* cited by examiner

TARGET COMPUTER PROCESSOR UNIT (CPU) DETERMINATION DURING CACHE INJECTION USING INPUT/OUTPUT (I/O) HUB/CHIPSET RESOURCES

BACKGROUND OF THE INVENTION

The present disclosure relates generally to data processing and, in particular, to a method, system, and computer program product for target computer processor unit (CPU) determination during cache injection using I/O hub or chipset resources.

Recently, direct cache access (also referred to as cache injection) schemes have been developed. In addition, 'receive message' processing schemes have been developed to "pin" a receive message handler on a computer processing unit (CPU) so that cache locality is preserved. In a symmetrical multiprocessor (SMP) machine, cache injection transaction from an input/output (I/O) device requires a snoopy broadcast on the bus. Processor caches can snoop values and update caches; however, this is an expensive transaction considering that cache injection must execute concurrently with other operations like inter-processor communication and prefetching. In a non-uniform memory access (NUMA) machine, cache injection transactions require values to be broadcast to every processor in the NUMA domain, which consumes expensive interconnect bandwidth.

What is needed, therefore, is a way to inject I/O write values directly into a specific processor cache without requiring a broadcast to every processor cache in the hierarchy to reduce cache pollution and conserve processor complex interconnect bandwidth.

BRIEF SUMMARY OF THE INVENTION

Embodiments of the invention include a method for target computer processor unit (CPU) determination during cache injection using I/O hub or chipset resources. The method includes creating a cache injection indirection table on the input/output (I/O) hub or chipset. The cache injection indirection table includes fields for address or address range, CPU identifier, and cache type. In response to receiving an input/output (I/O) transaction, the I/O hub or chipset reads the address in an address field of the I/O transaction, looks up the address in the cache injection indirection table, and injects the address and data of the I/O transaction to a target cache associated with a CPU as identified in the CPU identifier field when, in response to the look up, the address is present in the address field of the cache injection indirection table.

Additional embodiments include a system for target computer processor unit (CPU) determination during cache injection using I/O hub or chipset resources. The system includes an I/O hub or chipset in communication with a processor complex. The I/O hub/chipset includes logic executing thereon for performing a method. The method includes creating a cache injection indirection table on the hub/chipset. The cache injection indirection table includes fields for address, CPU identifier, and cache type. In response to receiving an input/output (I/O) transaction, the I/O hub/chipset reads the address in an address field of the I/O transaction, looks up the address in the cache injection indirection table, and injects the address and data of the I/O transaction to a target cache associated with a CPU as identified in the CPU identifier field when, in response to the look up, the address is present in the address field of the cache injection indirection table.

Additional embodiments include a computer program product for target computer processor unit (CPU) determination during cache injection using I/O hub or chipset resources. The computer program product includes a storage medium readable by a processing circuit and storing instructions for execution by the processing circuit for implementing a method. The method includes creating a cache injection indirection table on the input/output (I/O) hub or chipset. The cache injection indirection table includes fields for address or address range, CPU identifier, and cache type. In response to receiving an input/output (I/O) transaction, the I/O hub or chipset reads the address in an address field of the I/O transaction, looks up the address in the cache injection indirection table, and injects the address and data of the I/O transaction to a target cache associated with a CPU as identified in the CPU identifier field when, in response to the look up, the address is present in the address field of the cache injection indirection table.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments of the invention relate to processes for implementing target computer processor unit (CPU) determination during cache injection using hub/chipset resources (also referred to herein as "cache injection management"). The cache injection management processes provide the ability to inject I/O write values directly into a specific processor cache without requiring a broadcast to every processor cache, as described farther in FIGS. 1-5. Cache injection refers to a process by which data values, e.g., in a direct memory access (DMA) write transaction, are directly injected into a hierarchically organized cache system in a broadcast-type manner; that is, incoming traffic, e.g., from a network, is broadcast to each of the caches in the hierarchy, as opposed to the system memory. By performing cache injection, subsequent access to the data is quicker, thereby reducing latency associated with accessing the system memory. The cache with the broadcasted address then updates its value. It will be understood that cache injection encompasses both cache line updates (the cache line already exists in the cache) and also cache line allocates (a new entry is made). The information is broadcast to each of the caches because the computer system's system chipset or I/O hub typically does not have knowledge of which cache has an I/O write address stored therein. This operation is performed for all addresses and associated data, since the I/O hub has no information regarding the cached addresses in the processor complex. Clearly, this process leads to considerable bandwidth waste, as 'inject'-able values are broadcast even for addresses not cached in any of the processor complex caches. The data transfer to memory processes described herein provide a means for injecting I/O write values directly into a specific processor cache (e.g., a target processor's cache) without requiring a broadcast to every processor cache in the hierarchy.

Figure 1:
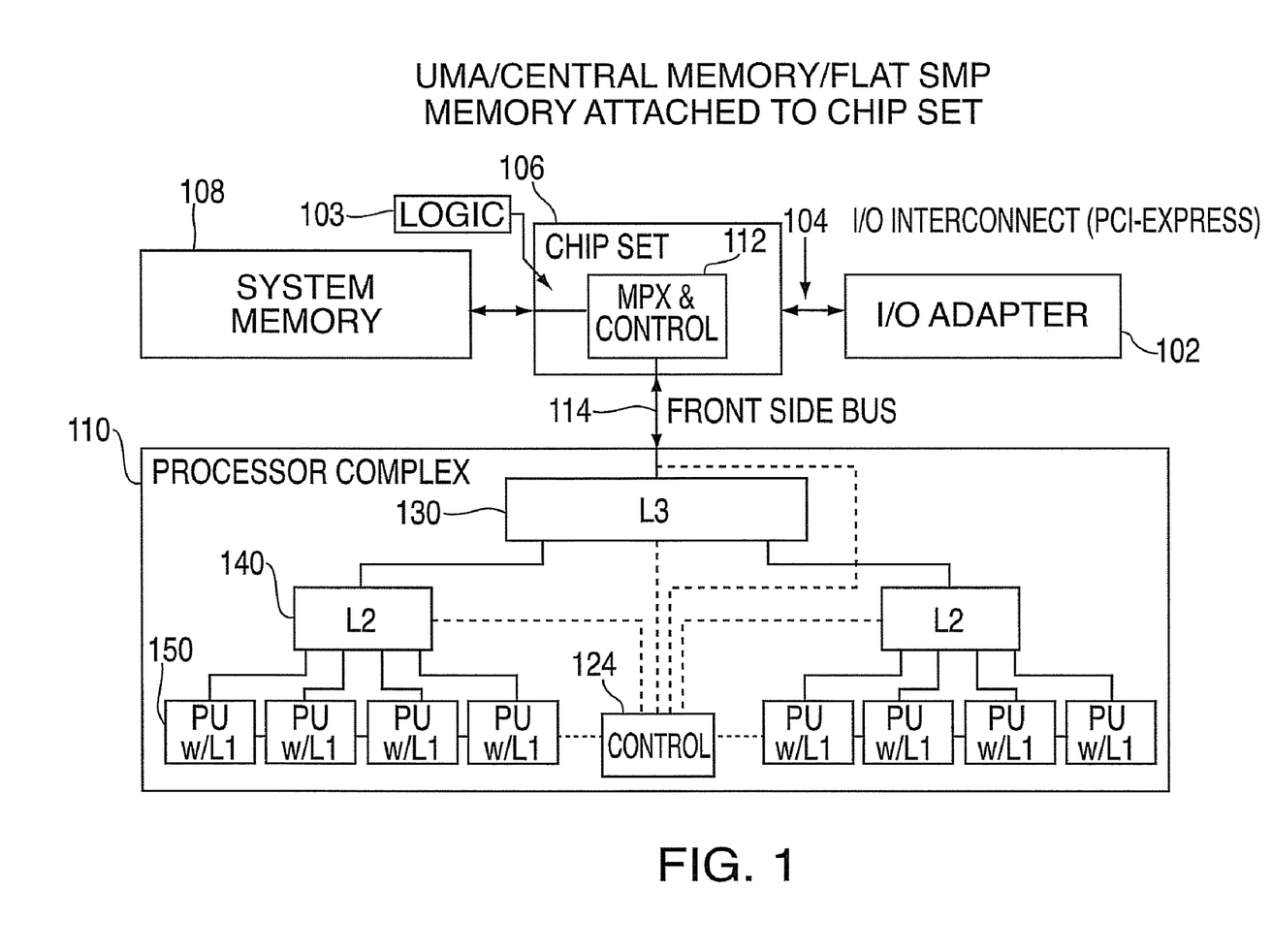
FIG. 1 is a symmetrical multiprocessor architecture (SMP) for use in implementing methods for target central processing unit (CPU) determination during cache injection via an hub/chipset in accordance with an exemplary embodiment.

Turning now to FIG. 1, an exemplary system for implementing the cache injection management processes will now be described. The system of FIG. 1 relates to an SMP architecture in which a system memory 108 is coupled with a system chipset 106 or I/O hub (e.g., a system employing Intel® processors). The system includes an I/O adapter 102 coupled to the chipset 106 via a bidirectional I/O interconnect 104 (e.g., PCI Express). The chipset 106 includes a processor and logic 103, and is communicatively coupled to the system memory 108 (also referred to herein as main memory). The chipset 106 is also coupled to a processor complex 110 over a front side bus (FSB) 114. The I/O adapter 102 reads/writes data between the chipset 106 and peripheral devices (not shown).

The processor complex 110 includes multiple processing units, each with a level 1 (L1) cache 150. In the embodiment shown in FIG. 1, the processor complex 110 also includes a level 2 (L2) cache 140 and level 3 (L3) cache 130. The levels 130, 140, and 150 of cache represent a storage hierarchy of the processor complex 110. L3 represents a highest cache level (highest memory latency), and L1 represents a lowest cache level (lowest memory latency) in the hierarchy. It will be understood that any number of cache levels may be implemented in order to realize the advantages of the invention. Three levels L1-L3 are provided for illustrative purposes only and are not to be construed as limiting in scope. In addition, as shown in FIG. 1 for illustrative purposes, multiple processing units (PUs) or groups of processing units may share a common Level 2 and Level 3 storage space in the cache hierarchy.

The processor complex 110 also includes a control unit 124 which manages the traffic (e.g., data transfers) associated with transactions occurring within the complex 110 with respect to the cache hierarchy L1-L3.

The chipset 106 may include a group of integrated circuits (chips) that work together to perform various tasks. In an exemplary embodiment, the chipset 106 includes a multiplexer (MPX) and controller 112 for directing the traffic associated with transactions occurring among the I/O adapter 102, the system memory 108, and the processor complex 110 (e.g., read and write transactions). While the embodiment described in FIG. 1 is directed to a chipset 106, it will be understood that other devices may be utilized in implementing the data transfer to memory processes (e.g., cards, boards, etc.).

As described above, conventional systems perform cache injection by broadcasting data values of a transaction to each of the caches in a hierarchically organized cache system. This is reflected in FIG. 1 by the solid lines directly interconnecting MPX 112 to L3, L3 to L2, and L2 to L1. The target CPU determination during cache injection using hub/chipset resources described in these exemplary embodiments utilize logic executing on the system chipset 106 (e.g., software/firmware) to perform hub/chipset-side target CPU determination during cache injection to inject data values for a transaction directly into an identified target processor's cache, as shown e.g., by the dotted lines in the processor complex 110 of FIG. 1.

Figure 2:
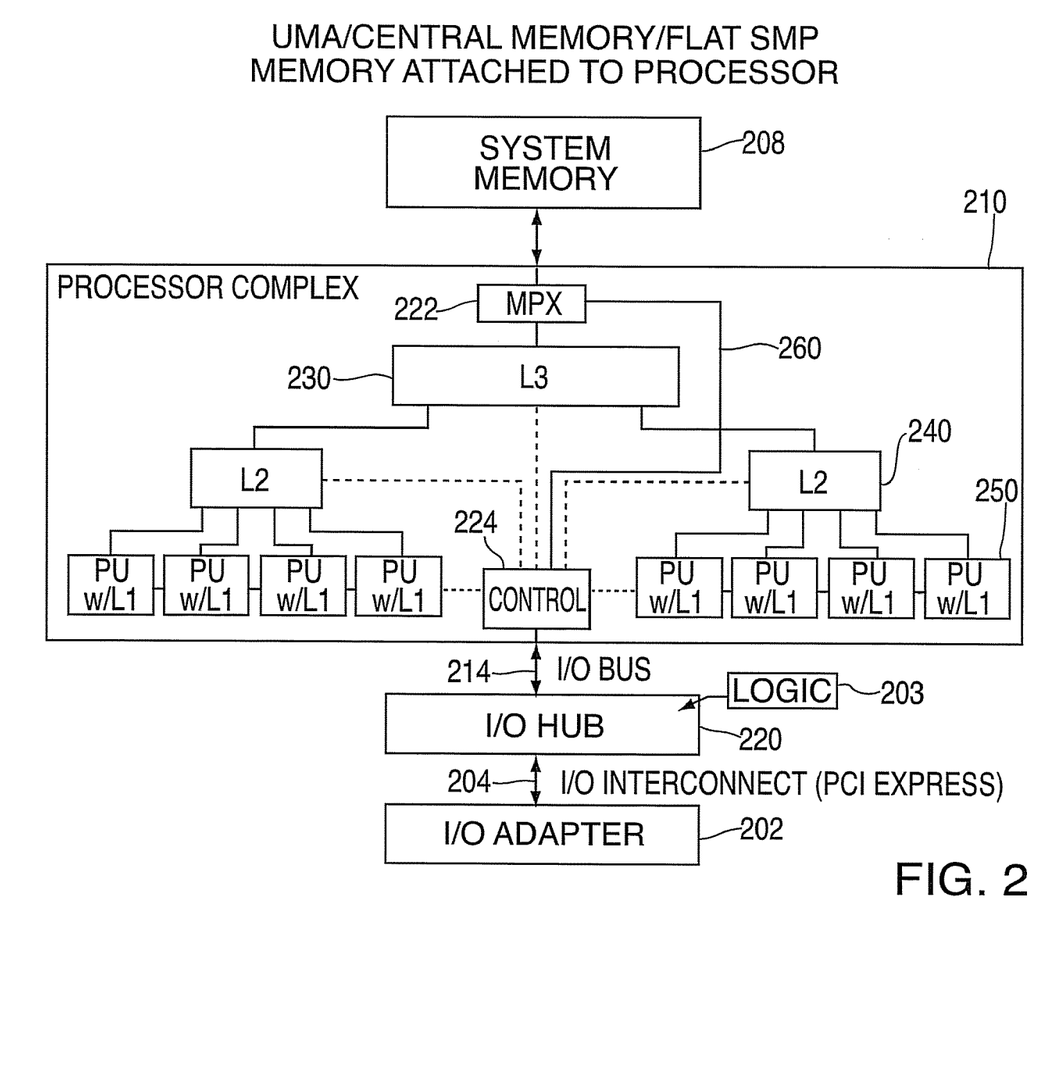
FIG. 2 is a symmetrical multiprocessor architecture (SMP) for use in implementing methods for target central processing unit (CPU) determination during cache injection via an hub/chipset in accordance with another exemplary embodiment.

Turning now to FIG. 2, a system upon which the cache injection management processes may be implemented in accordance with another exemplary embodiment will now be described. The system of FIG. 2 relates to an SMP architecture in which a system memory 208 is coupled with a processor complex 210 (e.g., a system employing AMD® processors or IBM® System z™ or p™ processors). Various components of the system of FIG. 2 overlap in function with components described above in FIG. 1. To this extent, these components and/or functions will not be described in detail. The system of FIG. 2 includes an I/O adapter 202 in communication with an I/O hub 220 over an I/O interconnect 204 (e.g., PCIe). The I/O hub 220 includes a processor and logic 203, and is communicatively coupled to the processor complex 210 via an I/O bus 214. The processor complex 210, likewise, is communicatively coupled to the system memory 208 (also referred to as main memory). The processor complex 210 includes a cache hierarchy with three levels of cache, namely L1 250, L2 240, and L3 230. The I/O hub 220 communicates with the processor complex 210 via control unit 224 which directs traffic between the I/O hub 220, the cache hierarchy, and the system memory 208 via a multiplexer 222.

The I/O adapter 202 reads/writes data to the processor complex 210 and the system memory 208 via the I/O interconnect 204, I/O hub 220, I/O bus 214 and MPX 222. For example, in a conventional cache injection process, the data transaction or request is generated in the I/O adapter 102 and distributed over the I/O interconnect 204 to the I/O hub 220 using, e.g., PCI Express protocols. The I/O hub 220 performs a translation (e.g., transforming the PCI Express protocols to those in which the I/O bus 214 will understand) and distributes the translated data over the I/O bus 214 to the control unit 224 where it is sent directly to the L3 cache 230. The cache injection management processes of the exemplary embodiments utilize logic 203 executing on the I/O hub 220 (e.g., software/firmware) to perform host-side target CPU determination during cache injection, such that the data values in an I/O transaction may be directed injected into a target processor's cache, as opposed to a general broadcast to all of the cache locations in the processor complex 210. This is shown in FIG. 2 by the dotted lines from the control unit 224 representing wires used to activate and target a specific cache.

Figure 3:
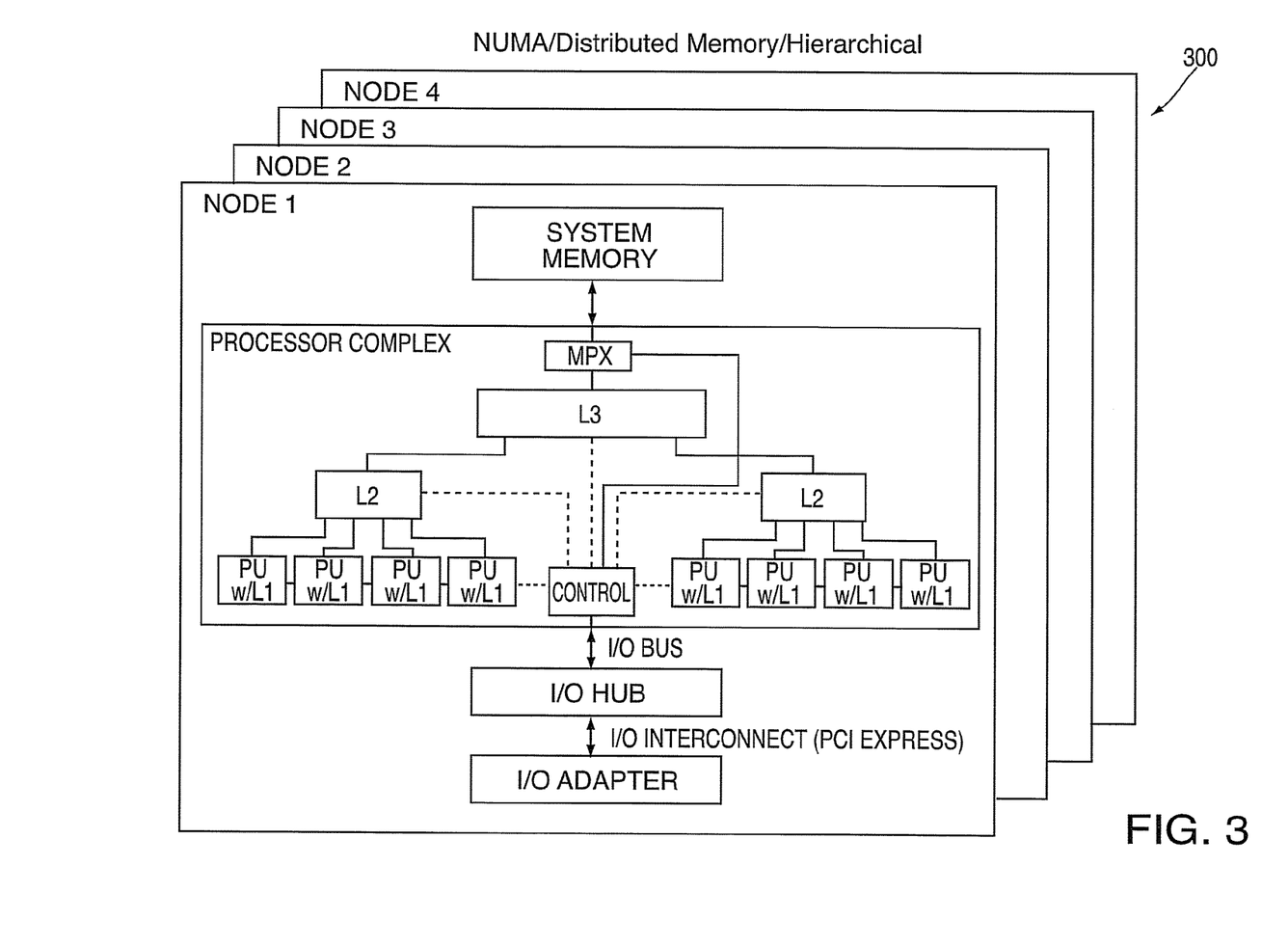
FIG. 3 is a non-uniform memory access (NUMA) architecture with distributed memory for use in implementing methods for target central processing unit (CPU) determination during cache injection via an hub/chipset in accordance with yet another exemplary embodiment.

Turning now to FIG. 3, a non-uniform memory access (NUMA) architecture with distributed memory for use in implementing direct cache injection management will now be described. The system of FIG. 3 includes multiple nodes 300 (Nodes 1-4), which communicate among one another for performing data transactions including the host-side methods for target CPU determination during cache injection processes described herein. Each of the Nodes 1-4 may include a multiplexer (MPX) (e.g., MPX 222) that steers data to system memory or cache hierarchy in the processor complex. The processor complex for each of Nodes 1-4 are interconnected and communicate with one another to form the NUMA, or distributed, memory model-based machine. Keeping data values coherent in the caches may be implemented, e.g., using scalable directory-based cache coherency techniques or snoopy bus protocols. It will be understood that the direct cache injection management processes may be implemented over a system that includes multiple nodes in an SMP architecture as shown, e.g., in FIG. 1 as well. For example, multiple nodes may be interconnected via chipsets of each of the nodes.

In an exemplary embodiment, the cache injection management processes enable the chipset 106 to determine a particular CPU's cache for injecting data values based upon preset identifiers stored in the chipset 106. That is, the I/O transaction is embedded with a CPU identifier and cache type. In the I/O interconnect 104, e.g., PCI Express, a transaction layer thereof generates header and data for the transaction. The transaction layer header carries this information for memory write PCI transactions. When the transaction reaches the system chipset 106 of FIG. 1, the chipset 106 embeds the CPU identifier and cache type in the transaction and directs the transaction to the target processor identified in the transaction as described further herein.

Alternatively, as shown in FIG. 2, when the transaction reaches the I/O hub 220 of FIG. 2, the I/O hub 220 embeds the CPU identifier and cache type in the transaction and directs the entire transaction to the target processor identified in the transaction as described further herein.

Figure 4:
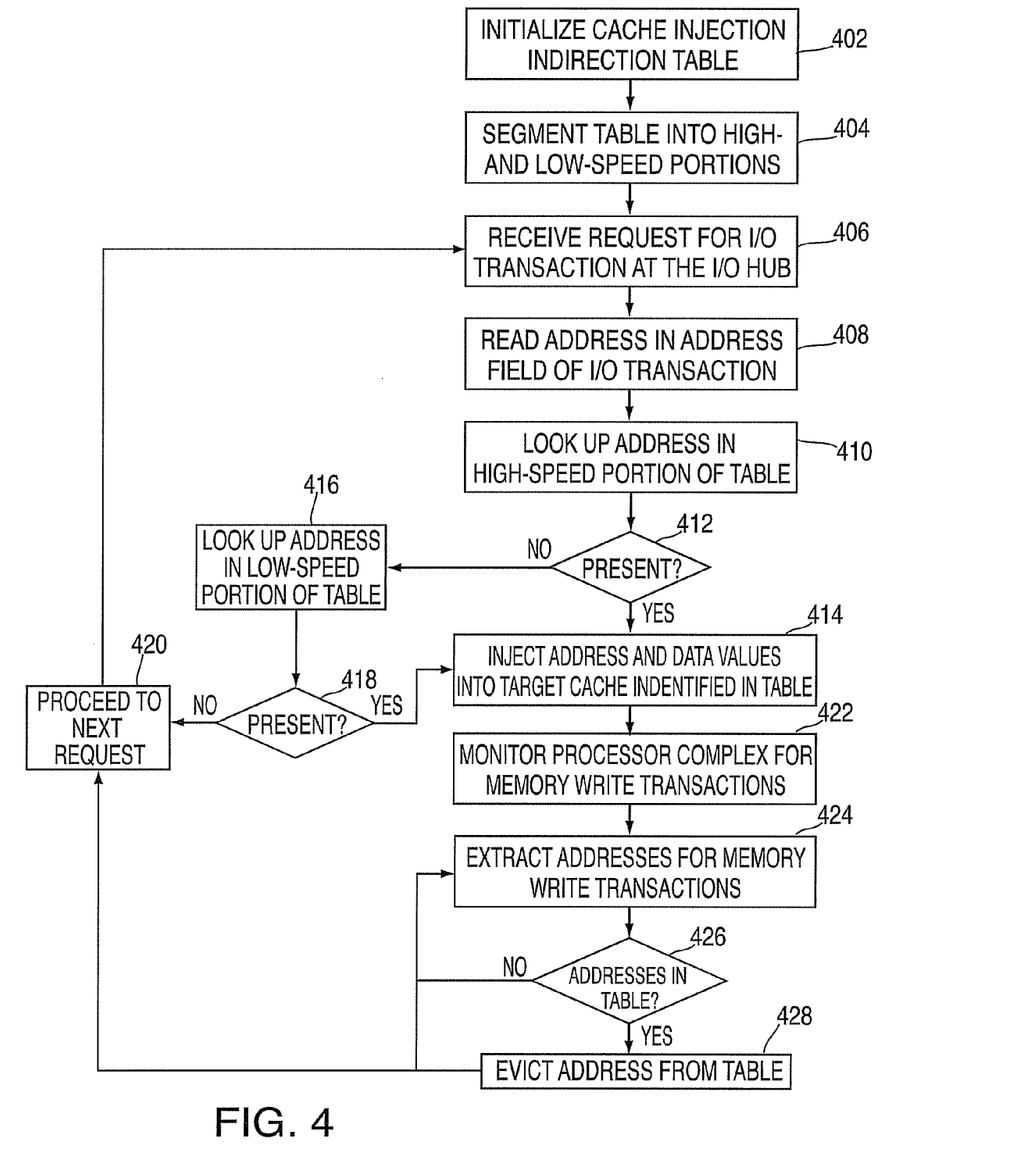
FIG. 4 is a flow diagram describing a process for implementing target central processing unit (CPU) determination during cache injection via an hub/chipset in accordance with an exemplary embodiment.
Figure 5A:
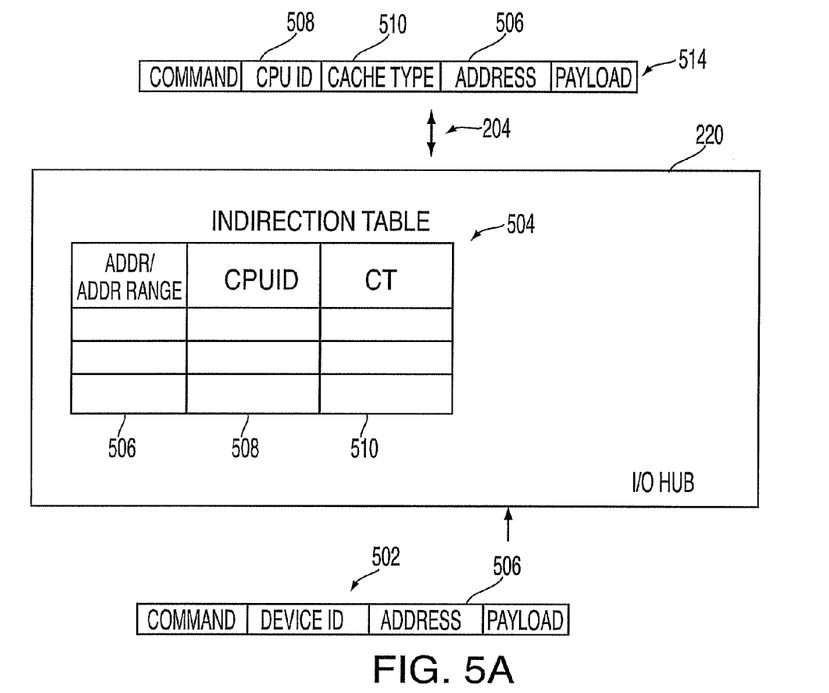
FIG. 5 is a block diagram describing components of an input/output (I/O) hub/chipset used in the system of FIG. 2 in accordance with an exemplary embodiment.
Figure 5B:
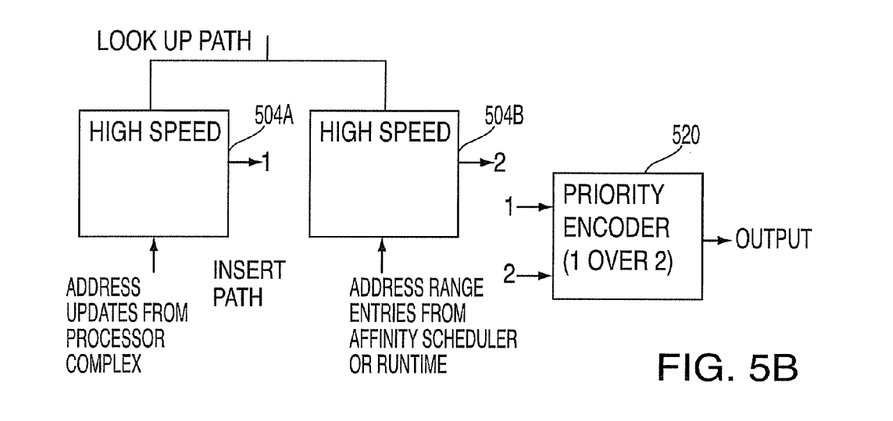

Turning now to FIGS. 4 and 5, an I/O adapter and process for implementing the cache injection management processes will now be described in exemplary embodiments. For purposes of illustration, the processes described in FIG. 4 relate to the I/O hub 220 of FIG. 2.

As indicated above, the direct cache injection management processes enable I/O hub-side methods for target CPU determination during cache injection. The hub-side methods provide a means to inject I/O write values directly into a specific processor cache without requiring a broadcast to every processor cache as will now be described.

At step 402, a cache injection indirection table 504 is initialized on I/O hub 220. Entries may be recorded into the cache injection indirection table 504 based upon criteria, such as address range, device identifier (e.g., I/O devices), and data access patterns. The entries may be determined and recorded in the table 504 using, e.g., a compiler or a special run-time system that determines addresses based on information from a cache-affinity scheduling scheme.

The cache injection indirection table 504 includes an address field for storing addresses or address ranges 506, a CPU ID field for storing CPU identifiers 508, and a cache type field 510 for storing cache types 512. The cache type field provides for categories for each of multiple levels of hierarchically organized caches in a processor complex 210 (e.g., level 1 through level n). The cache injection indirection table 504 may store entries for cache lines that change state on a frequent basis (as the I/O hub 220 on which it resides is closer to the processor complex 210 and can be updated rapidly). Accordingly, the cache injection indirection table 504 may be segmented into a high-speed portion 504A and a slow-speed portion 504B at step 404. This segmentation enables addresses that are entered into the high-speed portion 504A to be processed more quickly as described herein. The high-speed portion 504A may be used for arbitrary addresses and the low-speed portion 504B may be used for cache-affinity scheduled or pinned address spaces. A "pinned" process is usually bound, locked or "tied" to a CPU or set of CPUs. It cannot be run on CPUs outside the group. Cache affinity scheduling algorithms of the operating system strive to maintain the working set of the process bound to the CPU chosen. Location of cache lines for arbitrary addresses can change every processor cycle, but affinity scheduled processes are likely to have their addresses localized to the CPUs for which they were initially bound. Addresses corresponding to affinity scheduled processes are less likely to change locations outside their bound CPUs every processor cycle.

When the I/O hub 220 receives an I/O transaction (e.g., request 502) at step 406, it reads the address 506 in an address field of the request 502 at step 408 and looks up the address in the high-speed portion 504A of the cache injection indirection table 504 (e.g., in address field 506) at step 410. At step 412, it is determined whether the address from the request 502 is present in the high-speed portion 504A of the indirection table 504. If so, the address and data (e.g., payload) from the request 502 are injected into the target cache identified by the CPU ID field at step 414.

On the other hand, if the address from the request 502 is not present in the high-speed portion 504A of the indirection table 504, the I/O hub 220 looks up the address 506 from the request 502 in the low-speed portion 504B of the indirection table 504 at step 416. At step 418, it is determined whether the address 506 from the request 502 is present in the low-speed portion 504B of the indirection table 504. If not, the I/O hub 220 proceeds to the next I/O transaction (request) at step 420, and the process returns to step 406. However, if the address from the request 502 is present in the low-speed portion 504B of the indirection table 504, the address 506 and data (e.g., payload) from the request 502 are injected into the target cache identified by the CPU ID field 508 at step 414. In another embodiment of the present invention, both high-speed and low-speed tables 504A and 504B may be looked up at the same time, with a priority encoder 520 giving priority to look up results from the high-speed table 504A. The high-speed table is given higher priority, as its state is consistent with the location of I/O write addresses in caches of the processor complex 210. The low-speed table 504B has addresses with corresponding cache lines that can move locations if the OS (Operating System) is forced to re-schedule processes to a different CPU group.

At step 422, the I/O hub 220 monitors the processor complex 210 for system memory 206 write transactions. The I/O hub 220 extracts addresses associated with any memory write transactions it finds as a result of the monitoring at step 424. At step 426, it is determined whether the addresses found in response to the monitoring are in the indirection table 504. If so, these addresses (entries) are evicted from the indirection table 504 at step 428 and the process returns to both of steps 420 and 422. If however, at step 426, the addresses found in response to the monitoring are not present in the indirection table 504, the process simply returns to step 420 and 422, without evicting any entries from table 504. An I/O write address corresponding to a cache line that is being written back to memory is no longer in a processor complex cache and does not need to be stored in table 504.

In another embodiment of the present invention, table 504 stores inject_update and inject_allocate fields (corresponding to cache line write update and cache line write allocate operations). These fields are not shown in FIG. 5 and are initially set to '1' and '0' respectively. This is because based on current information, the address in the cache can be directly updated and does not need to be allocated in any cache. If the I/O hub 220 sees a cache line write-back to memory, the I/O write address is no longer in any cache. This means that the I/O hub 220 updates field inject_update to '0' and inject_allocate to '1'. After this update, a new I/O write transaction to the same address will be allocated in the cache because of the inject_allocate setting of '1' since the cache line corresponding to the I/O address does not exist in any cache.

In yet another embodiment of the present invention, the I/O hub 220 receives success or failure indicator of a cache injection operation from the processor complex 210. It then uses a failed attempt at cache injection as a trigger to update fields inject_update and inject_allocate as described above. For caches that do not support write-allocate or directory based cache coherence, inject_update may be followed by a broadcast update in the processor complex 210. For reader-writer sharing patterns between remote CPUs in a SMP (Symmetric Multiprocessor) machine, inject_update may be followed by a broadcast and then by inject_allocate. Success or failure of an operation is used as a trigger to advance to a successive state.

It will be understood that multiple adapters (such as the adapter 202) may interact with the processor complex 210 and I/O hub 220 concurrently. The I/O hub 220 indirection table 504 may hold addresses that are common across several adapters (e.g., channel-bonded adapters, where a group of adapters are virtualized to form a single unit).

Figure 6:
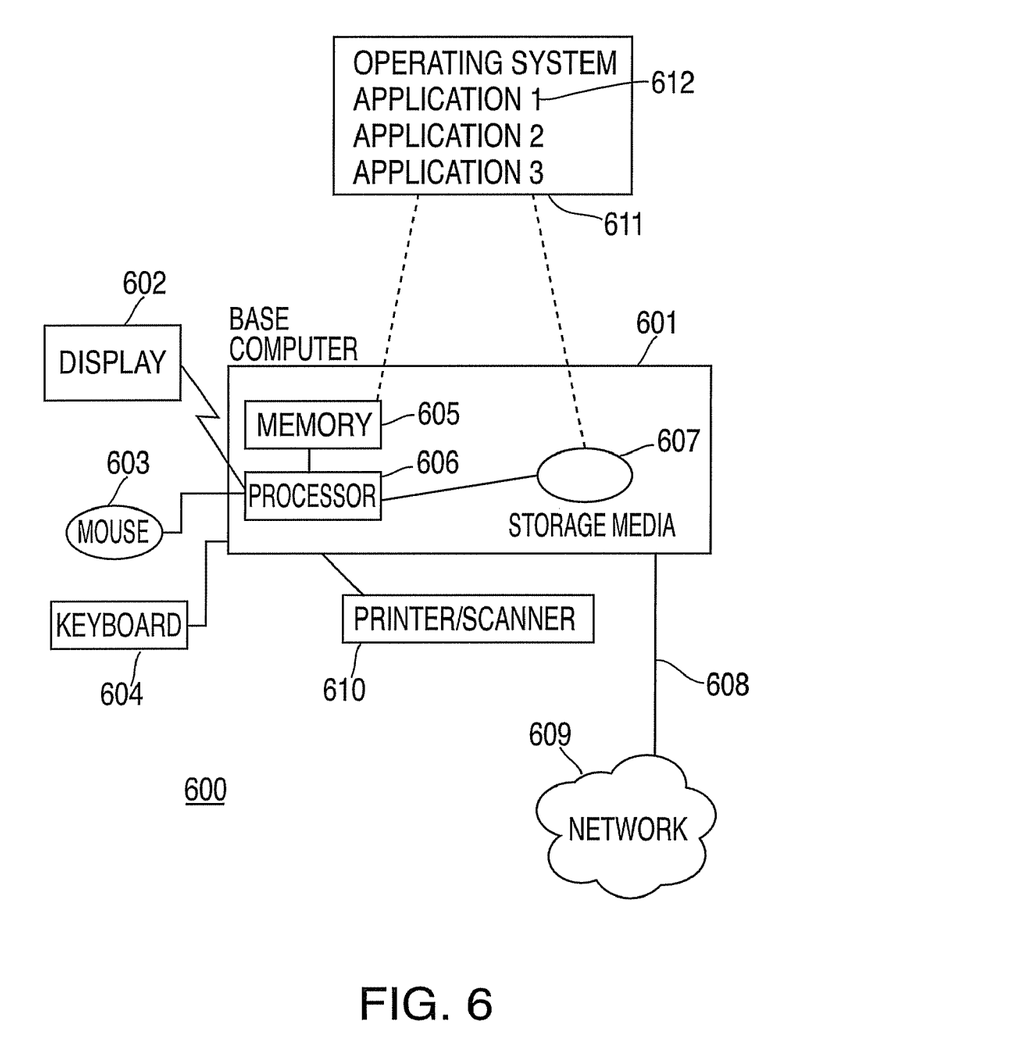
FIG. 6 is a workstation for implementing target central processing unit (CPU) determination during cache injection in accordance with an exemplary embodiment.

FIG. 6 illustrates a representative workstation or server hardware system in which the present invention may be practiced. The system 600 of FIG. 6 comprises a representative computer system 601, such as a personal computer, a workstation or a server, including optional peripheral devices. The workstation 601 includes one or more processors 606 and a bus employed to connect and enable communication between the processor(s) 606 and the other components of the system 601 in accordance with known techniques. The bus connects the processor 606 to memory 605 and long-term storage 607 which can include a hard drive, diskette drive or tape drive for example. The system 601 might also include a user interface adapter, which connects the microprocessor 606 via the bus to one or more interface devices, such as a keyboard 604, mouse 603, a printer/scanner 610 and/or other interface devices, which can be any user interface device, such as a touch sensitive screen, digitized entry pad, etc. The bus also connects a display device 602, such as an LCD screen or monitor, to the microprocessor 606 via a display adapter.

The system 601 may communicate with other computers or networks of computers by way of a network adapter capable of communicating 608 with a network 609. Example network adapters are communications channels, token ring, Ethernet or modems. Alternatively, the workstation 601 may communicate using a wireless interface, such as a CDPD (cellular digital packet data) card. The workstation 601 may be associated with such other computers in a Local Area Network (LAN) or a Wide Area Network (WAN), or the workstation 601 can be a client in a client/server arrangement with another computer, etc. All of these configurations, as well as the appropriate communications hardware and software, are known in the art.

Figure 7:
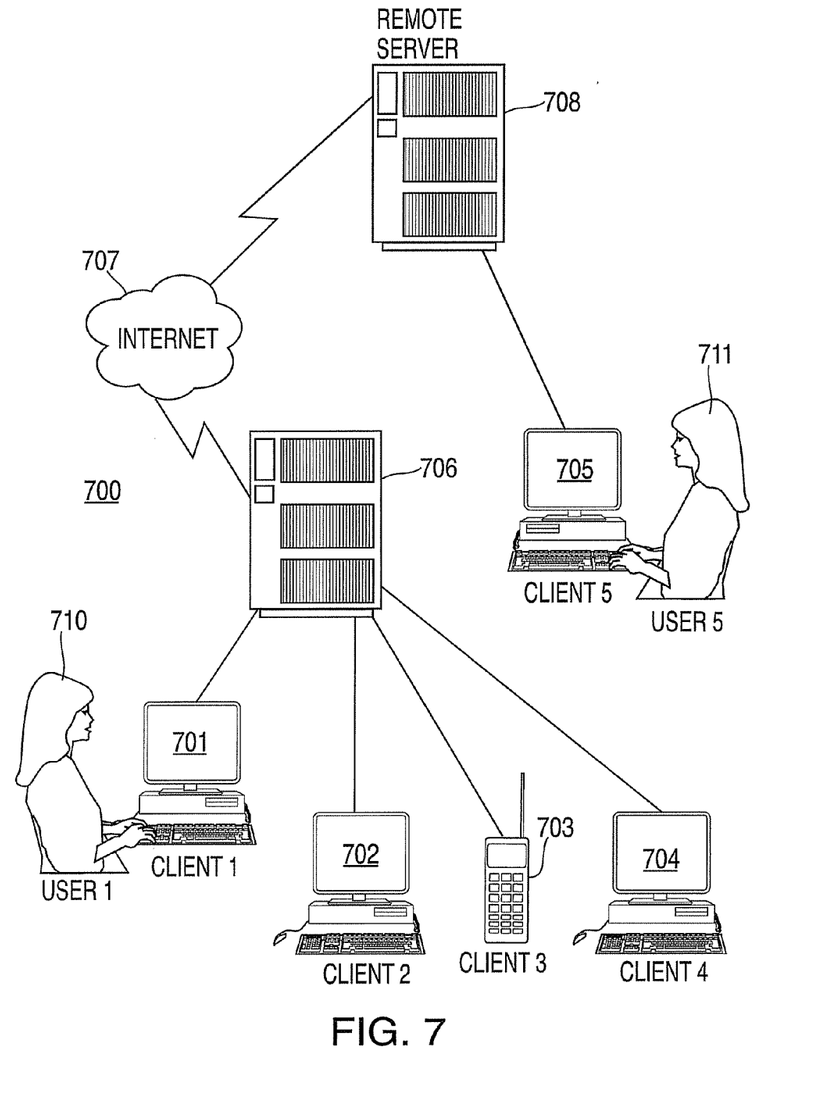
FIG. 7 is a data processing network for implementing target central processing unit (CPU) determination during cache injection in accordance with an exemplary embodiment.

FIG. 7 illustrates a data processing network 700 in which the present invention may be practiced. The data processing network 700 may include a plurality of individual networks, such as a wireless network and a wired network, each of which may include a plurality of individual work-stations 601, 701, 702, 703, and 704. Additionally, as those skilled in the art will appreciate, one or more LANs may be included, where a LAN may comprise a plurality of intelligent workstations coupled to a host processor.

Still referring to FIG. 7, the network may also include mainframe computers or servers, such as a gateway computer (client server 706) or application server (remote server 708 which may access a data repository and may also be accessed directly from a workstation 705). The gateway computer 706 serves as a point of entry into each network 707. A gateway is needed when connecting one networking protocol to another. The gateway 706 may be preferably coupled to another network (the Internet 707 for example) by means of a communications link. The gateway 706 may also be directly coupled to one or more workstations 601, 701, 702, 703, and 704 using a communications link. The gateway computer may be implemented utilizing an IBM eServer zSeries® 600 Server available from IBM Corp.

Software programming code which embodies the present invention is typically accessed by the processor 606 of the system 601 from long-term storage media 607, such as a CD-ROM drive or hard drive. The software programming code may be embodied on any of a variety of known media for use with a data processing system, such as a diskette, hard drive, or CD-ROM. The code may be distributed on such media, or may be distributed to users 710, 711 from the memory or storage of one computer system over a network to other computer systems for use by users of such other systems.

Alternatively, the programming code 611 may be embodied in the memory 605, and accessed by the processor 606 using the processor bus. Such programming code includes an operating system which controls the function and interaction of the various computer components and one or more application programs 612. Program code is normally paged from dense storage media 607 to high-speed memory 605 where it is available for processing by the processor 606. The techniques and methods for embodying software programming code in memory, on physical media, and/or distributing software code via networks are well known and will not be further discussed herein.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for target computer processor unit (CPU) determination during cache injection using input/output (I/O) hub/chipset resources, comprising:
   creating a cache injection indirection table on the input/output (I/O) hub/chipset that comprises one of an input/output (I/O) hub and a system chipset, the cache injection indirection table including fields for address or address range, CPU identifier, and cache type; and
   in response to receiving an input/output (I/O) transaction, the I/O hub/chipset performs:
   reading the address in an address field of the I/O transaction;
   looking up the address in the cache injection indirection table;
   injecting the address and data of the I/O transaction to a target cache associated with a CPU as identified in the CPU identifier field when, in response to the look up, the address is present in the address field of the cache injection indirection table;
   monitoring a processor complex by the I/O hub/chipset for memory write I/O transactions;
   extracting addresses from memory write I/O transactions found in response to the monitoring;
   looking up the addresses of the memory write I/O transactions in the cache injection indirection table; and
   for addresses in the cache injection indirection table that match the addresses in the memory write I/O transactions, evicting the matching addresses from the cache injection indirection table, the matching reflecting stale addresses.

2. The method of claim 1, further comprising:
   segmenting the cache injection indirection table into a high-speed portion for arbitrary addresses and a low-speed portion for cache-affinity scheduled or pinned address spaces;
   wherein looking up the address includes looking up the address in the high-speed portion of the cache indirection table and injecting the address and data of the I/O transaction to a target cache associated with a CPU as identified in the CPU identifier field when, in response to the look up in the high-speed portion of the cache indirection table, the address is present in the address field of the high-speed portion;
   looking up the address in the low-speed portion of the cache injection indirection table when, in response to looking up the address in the high-speed portion, the address is not present in the address field of the high-speed portion of the cache injection indirection table; and
   injecting the address and data of the I/O transaction to a target cache associated with a CPU as identified in the CPU identifier field when, in response to the look up in the low-speed portion of the cache injection indirection table, the address is present in the address field of the low-speed portion of the cache injection indirection table.

3. The method of claim 1, further comprising:
   segmenting the cache injection indirection table into a high-speed portion for arbitrary addresses and a low-speed portion for cache-affinity scheduled or pinned address spaces;
   wherein looking up the address in the cache injection indirection table includes:
   simultaneously looking up the address in both the high-speed portion and the low-speed portion of the cache injection indirection table; and
   using a priority scheduler in communication with the cache injection indirection table to process results of the high-speed portion look up before processing results of the low-speed portion look up.

4. The method of claim 1, further comprising recording entries in the cache injection indirection table based upon at least one of:
   address range;
   device identifier; and
   data access patterns;
   wherein determining and recording entries in the cache injection indirection table is implemented via at least one of:
   a compiler; and
   a run-time system that determines addresses based on information from a cache-affinity scheduling scheme.

5. The method of claim 1, further comprising:
   wherein the cache injection indirection table further comprises an inject update field and an inject allocate field, the inject update field corresponding to cache line write updates and the inject allocate field corresponding to cache line write allocates, the inject update field initialized to 1 and the inject allocate field initialized to 0; and
   setting the inject update field to 0 and the inject allocate field to 1 for each of the addresses corresponding to the memory write I/O transactions, indicating that the respective address is no longer in any cache;
   wherein a new I/O write transaction to one of the respective addresses is allocated in a cache resulting from the inject allocate field setting of 1.

6. The method of claim 5, further comprising:
   receiving at the I/O hub/chipset a success or failure associated with a cache injection operation from a processor complex associated with the cache; and
   using a failed attempt at cache injection as a trigger to update the respective inject update and inject allocate fields.

7. A system for target computer processor unit (CPU) determination during cache injection using input/output (I/O) hub/chipset resources, comprising:
   an I/O hub/chipset in communication with a processor complex; and
   logic executing on the hub/chipset, the logic performing:
   initializing a cache injection indirection table on the hub/chipset, the cache injection indirection table including fields for address or address ranges, CPU identifier, and cache type; and
   in response to receiving an input/output I/O transaction, the hub/chipset performs:
   reading the address in an address field of the I/O transaction;
   looking up the address in the cache injection indirection table;

injecting the address and data of the I/O transaction to a target cache associated with a CPU as identified in the CPU identifier field when, in response to the look up, the address is present in the address field of the cache injection indirection table;

monitoring a processor complex for memory write I/O transactions;

extracting addresses from memory write I/O transactions found in response to the monitoring;

looking up the addresses of the memory write I/O transactions in the cache injection indirection table; and for addresses in the cache injection indirection table that match addresses in the memory write I/O transactions, evicting the matching addresses from the cache injection indirection table, the matching reflecting stale addresses.

8. The system of claim 7, wherein the logic further performs:

segmenting the cache injection indirection table into a high-speed portion for arbitrary addresses and a low-speed portion for cache-affinity scheduled or pinned address spaces;

wherein looking up the address includes looking up the address in the high-speed portion of the cache indirection table and injecting the address and data of the I/O transaction to a target cache associated with a CPU as identified in the CPU identifier field when, in response to the look up in the high-speed portion of the cache indirection table, the address is present in the address field of the high-speed portion;

looking up the address in the low-speed portion of the cache injection indirection table when, in response to looking up the address in the high-speed portion, the address is not present in the address field of the high-speed portion of the cache injection indirection table; and injecting the address and data of the I/O transaction to a target cache associated with a CPU as identified in the CPU identifier field when, in response to the look up in the low-speed portion of the cache injection indirection table, the address is present in the address field of the low-speed portion of the cache injection indirection table.

9. The system of claim 7, wherein the logic further performs:

segmenting the cache injection indirection table into a high-speed portion for arbitrary addresses and a low-speed portion for cache-affinity scheduled or pinned address spaces;

wherein looking up the address in the cache injection indirection table includes:

simultaneously looking up the address in both the high-speed portion and the low-speed portion of the cache injection indirection table; and using a priority scheduler in communication with the cache injection indirection table to process results of the high-speed portion look up before processing results of the low-speed portion look up.

10. The system of claim 7, wherein the logic further performs:

recording entries in the cache injection indirection table based upon at least one of:

address range;

device identifier; and data access patterns;

wherein determining and recording entries in the cache injection indirection table is implemented via at least one of:

a compiler; and a run-time system that determines addresses based on information from a cache-affinity scheduling scheme.

11. The system of claim 7, wherein the logic further performs:

wherein the cache injection indirection table further comprises an inject update field and an inject allocate field, the inject update field corresponding to cache line write updates and the inject allocate field corresponding to cache line write allocates, the inject update field initialized to 1 and the inject allocate field initialized to 0; and setting the inject update field to 0 and the inject allocate field to 1 for each of the addresses corresponding to the memory write I/O transactions, indicating that the respective address is no longer in any cache;

wherein a new I/O write transaction to one of the respective addresses is allocated in a cache resulting from the inject allocate field setting of 1.

12. The system of claim 11, wherein the logic further performs:

receiving at the I/O hub/chipset a success or failure associated with a cache injection operation from a processor complex associated with the cache; and using a failed attempt at cache injection as a trigger to update the respective inject update and inject allocate fields.

13. A computer program product for target computer processor unit (CPU) determination during cache injection using input/output (I/O) hub/chipset resources, the computer program product comprising:

a storage medium readable by a processing circuit and storing instructions for execution by the processing circuit for implementing a method, the method comprising:

creating a cache injection indirection table on the input/output (I/O) hub/chipset that comprises one of an input/output (I/O) hub and a system chipset, the cache injection indirection table including fields for address or address range, CPU identifier, and cache type; and in response to receiving an input/output (I/O) transaction, the I/O hub/chipset performs:

reading the address in an address field of the I/O transaction;

looking up the address in the cache injection indirection table;

injecting the address and data of the I/O transaction to a target cache associated with a CPU as identified in the CPU identifier field when, in response to the look up, the address is present in the address field of the cache injection indirection table;

monitoring a processor complex by the I/O hub/chipset for memory write I/O transactions;

extracting addresses from memory write I/O transactions found in response to the monitoring;

looking up the addresses of the memory write I/O transactions in the cache injection indirection table; and for addresses in the cache injection indirection table that match the addresses in the memory write I/O transactions, evicting the matching addresses from the cache injection indirection table, the matching reflecting stale addresses.

14. The computer program product of claim 13, further comprising instructions for implementing:

segmenting the cache injection indirection table into a high-speed portion for arbitrary addresses and a low-speed portion for cache-affinity scheduled or pinned address spaces;

wherein looking up the address includes looking up the address in the high-speed portion of the cache indirection table and injecting the address and data of the I/O transaction to a target cache associated with a CPU as identified in the CPU identifier field when, in response to the look up in the high-speed portion of the cache indirection table, the address is present in the address field of the high-speed portion;

looking up the address in the low-speed portion of the cache injection indirection table when, in response to looking up the address in the high-speed portion, the address is not present in the address field of the high-speed portion of the cache injection indirection table; and injecting the address and data of the I/O transaction to a target cache associated with a CPU as identified in the CPU identifier field when, in response to the look up in the low-speed portion of the cache injection indirection table, the address is present in the address field of the low-speed portion of the cache injection indirection table.

15. The computer program product of claim 13, further comprising instructions for implementing:

segmenting the cache injection indirection table into a high-speed portion for arbitrary addresses and a low-speed portion for cache-affinity scheduled or pinned address spaces;

wherein looking up the address in the cache injection indirection table includes:

simultaneously looking up the address in both the high-speed portion and the low-speed portion of the cache injection indirection table; and using a priority scheduler in communication with the cache injection indirection table to process results of the high-speed portion look up before processing results of the low-speed portion look up.

16. The computer program product of claim 13, further comprising instructions for recording entries in the cache injection indirection table based upon at least one of:

address range;

device identifier; and data access patterns;

wherein determining and recording entries in the cache injection indirection table is implemented via at least one of:

a compiler; and a run-time system that determines addresses based on information from a cache-affinity scheduling scheme.

17. The computer program product of claim 13, further comprising instructions for implementing:

wherein the cache injection indirection table further comprises an inject update field and an inject allocate field, the inject update field corresponding to cache line write updates and the inject allocate field corresponding to cache line write allocates, the inject update field initialized to 1 and the inject allocate field initialized to 0; and setting the inject update field to 0 and the inject allocate field to 1 for each of the addresses corresponding to the memory write I/O transactions, indicating that the respective address is no longer in any cache;

wherein a new I/O write transaction to one of the respective addresses is allocated in a cache resulting from the inject allocate field setting of 1.

* * * * *